(12) United States Patent
Ogura et al.

(10) Patent No.: US 6,171,727 B1
(45) Date of Patent: Jan. 9, 2001

(54) ALKALINE SECONDARY BATTERY AND METHOD OF MANUFACTURING THE SAME

(75) Inventors: Takao Ogura, Kyoto; Atsushi Tani, Nara, both of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/250,489

(22) Filed: Feb. 16, 1999

(30) Foreign Application Priority Data

Feb. 16, 1998 (JP) .................................................. 10-048563

(51) Int. Cl.⁷ ...................................................... H01M 4/58
(52) U.S. Cl. ........................ 429/218.2; 429/223; 429/224
(58) Field of Search ................................ 429/218.2, 223, 429/224

(56) References Cited

FOREIGN PATENT DOCUMENTS

| | | |
|---|---|---|
| 0 645 833 | 3/1995 | (EP) . |
| 4-121960 | 4/1992 | (JP) . |
| 5-135763 | 6/1993 | (JP) . |
| 6-163072 | 6/1994 | (JP) . |
| 8-31416 | 2/1996 | (JP) . |
| 8-64245 * | 3/1996 | (JP) . |
| 8-138658 | 5/1996 | (JP) . |
| 8-250099 | 9/1996 | (JP) . |
| 9-45331 | 2/1997 | (JP) . |
| 9-63644 * | 3/1997 | (JP) . |

OTHER PUBLICATIONS

Patent Abstracts of Japan, vol. 016, No. 381 (E–1248), Aug. 14, 1992 (corresponds to JP 4–121960).

* cited by examiner

Primary Examiner—Laura Weiner
(74) Attorney, Agent, or Firm—Fitzpatrick, Cella, Harper & Scinto

(57) ABSTRACT

An alkaline secondary battery comprises a negative electrode made of a hydrogen storing alloy with its surface covered by a layer containing at least carbonate. As method for covering the surface of the hydrogen storing alloy by a layer containing carbonate, carbonate of an alkali metal or an alkaline earth metal may be added to the negative electrode, the positive electrode, the separator or the electrolyte.

11 Claims, 1 Drawing Sheet

ALKALINE SECONDARY BATTERY AND METHOD OF MANUFACTURING THE SAME

BACKGROUND OF THE INVENTION

1. Field of the Invention

This invention relates to a secondary battery having a negative electrode made of a hydrogen storing alloy and also to a method of manufacturing such a secondary battery. More particularly, the present invention relates to an alkaline secondary battery adapted to prevent oxidation/degradation of the hydrogen storing alloy of the negative electrode from occurring during charging where oxygen gas can be generated from the positive electrode; such an adaptation consequently improves the cycle service life and prevents any possible reduction in the capacity of the battery that can appear as a result of prolonged overcharging. It also relates to a method of manufacturing such an improved battery.

2. Related Background Art

In recent years, more research efforts have been directed than ever to realizing improved secondary batteries in light of environmental protection concerns meeting the demand for secondary batteries to be used for proliferated use in portable equipment. As for the issue of environmental protection, attempts have been made to eliminate the emission of carbon dioxide gas from automobiles running on fossil fuel by using electromobiles. The use of secondary batteries has also been considered for the load leveling purposes from the view point of effectively utilizing electric power. Requirements to be met by secondary batteries to be used for such applications include a large capacity, a light weight, a long cycle service life and low cost. On the other hand, secondary batteries to be used for portable equipment are especially required to have a large capacity and to be compact and lightweight. Nickel/hydrate secondary batteries and lithium secondary batteries have been made commercially available as they can meet the above requirements. As a matter of fact, massive R&D efforts are currently being concentrated on such secondary batteries.

The idea of producing nickel/hydrate secondary batteries using a negative electrode made of a hydrogen storing alloy is based on the use of $LaNi_5$. However, the use of $LaNi_5$ is accompanied by a number of problems including the tendency of generating hydrogen in the charging stage due to a high equilibrium pressure of hydrogen occlusion, reducing the electroconductivity as $LaNi_5$ expands and becomes finely powdery in the charging stage and corroding to make La react with alkali and produce $La(OH)_3$. These problems made the nickel/hydrate secondary battery using $LaNi_5$ commercially not unfeasible in the early days of development.

Later on, a method for replacing part of the La or part of the Ni with some other element, while maintaining the crystal form ($AB_5$ structure) of $LaNi_5$ was invented. For example, it is now possible to suppress the expansion of the alloy that can take place during the charging operation and reduce the cost of such a secondary battery by replacing part or all of the La with Mm (misch metal: roughly refined lanthanoid such as La, Ce, Pr or Nd). It is also possible to reduce the equilibrium pressure of hydrogen occlusion by replacing part of the Ni with Al and improve the corrosion resistance by partly replacing with Co. Again, it is possible to suppress the tendency of the alloy of becoming finely powdery by partly replacing with Mn. In fact, negative electrodes using a hydrogen storing alloy have been made commercially feasible by an appropriately combined use of such replacement elements.

Meanwhile, it has been found that hydrogen storing alloys such as $ZrMn_2$ ($AB_2$ structure), TiNi (AB structure), and $Mg_2Ni$ ($A_2B$ structure) having a crystal form other than that of the $AB_5$ structure can also be used for the negative electrode of an alkaline secondary battery. R&D efforts have also been directed to this field of technology. As a matter of fact, such hydrogen storing alloys are found to occlude more hydrogen than alloys with the $AB_5$ structure and hence are more promising when used as negative electrodes. Additionally, one or more than one of the metals of such hydrogen storing alloys can be replaced in a manner as described above by referring to metals having the $AB_5$ structure if they are used for the negative electrode. For example, Zr may be partly replaced by Ti, and Mn may be partly replaced by Ni, Co, Cr, Al or Fe for the purpose of preparing a commercially feasible negative electrode.

However, if compared with conventional nickel—cadmium secondary batteries, nickel/hydrate secondary batteries have a drawback in that the hydrogen storing alloy of the negative electrode is apt to be oxidized when the nickel electrode generates oxygen when an overcharged. More specifically, the hydrogen storing alloy is highly apt to be oxidized to reduce the capacity of the battery when the charge/discharge cycle is repeated or when a long charging process continues.

In an attempt to eliminate this drawback, particularly for hydrogen storing alloys of the $AB_5$ type, Japanese Patent Application Laid-Open No. 5-135763 proposes a method of rapidly cooling a hydrogen storing alloy with a particular composition. Another attempt is to specifically define the composition.

Known proposed methods for improving the performance of a hydrogen storing alloy that may or may not show the $AB_5$ structure include those described below.

Firstly, Japanese Patent Applications Laid-Open Nos. 8-250099 and 9-45331 disclose the use of a water-repelling layer on the surface of the negative electrode or of the separator at the side of the negative electrode to improve the oxygen gas absorbing performance and prevent oxidation/degradation of the hydrogen storing alloy. An oxygen gas absorbing reaction takes place on the surface of the hydrogen storing alloy as oxygen chemically reacts with hydrogen occluded in the hydrogen storing alloy and as oxygen is electro-chemically reduced to produce hydroxy ions on the surface. It is said that electro-chemical reduction also occurs on the surface of nickel that operates as an electricity collector. An oxygen gas absorbing reaction is observed particularly on the interface of the three layers of hydrogen storing alloy, alkaline electrolyte and oxygen gas, and the use of a water-repelling layer is believed to increase the area of the interface. Thus, while the use of a water repelling layer is highly effective for reducing the internal pressure of the battery, it causes the hydrogen storing alloy to directly contact oxygen gas to consequently oxidize/degrade the alloy. This technique may be effective when a particular composition showing the $AB_5$ structure is used.

Secondly, Japanese Patent Application Laid-Open No. 8-138658 discloses a method of adding zinc oxide or magnesium oxide to the hydrogen storing alloy of the battery, and Japanese Patent Application Laid-Open No. 5-41210 discloses a method of adding an oxide or hydroxide of copper or bismuth to the negative electrode made of hydrogen storing alloy. With either of these methods, oxygen gas is consumed by the catalytic effect of the added oxide or hydroxide. The hydrogen storing alloy of the battery may not be degraded by oxygen with either of these methods because oxygen does not directly contact the hydrogen storing alloy. However, oxygen gas would not be absorbed completely and satisfactorily through the catalytic effect of the added oxide or hydroxide that consequently, the internal pressure of the battery will rise considerably.

Thirdly, Japanese Patent Application Laid-Open No. 8-31416 discloses a method of forming a nonelectrolytic nickel plating layer around the hydrogen storing alloy, and Japanese Patent Application Laid-Open No. 6-163072 discloses a method of cobalt plating the surface of the hydrogen storing alloy. With either of these methods, an oxygen gas absorbing reaction takes place on the surface of the cobalt layer or the nickel layer, whichever appropriate, so that the hydrogen storing alloy may be minimally degraded and oxygen gas may be absorbed relatively quickly. While these methods are more advantageous than the above-listed methods as they do not give rise to any significant flaws in the initial stages of assembling batteries, the hydrogen storing alloy is broken into small pieces as the charge/discharge cycle is repeated to produce additional surfaces, which will then gradually be oxidized/degraded.

Finally, there has been proposed a method of suppressing generation of oxygen gas from the positive electrode to keep the negative electrode of the hydrogen storing alloy free from excessive load by controlling the charging process. However, in the case of an alkaline secondary battery, the proposed method reveals a drawback in that a sufficient battery capacity cannot be provided unless the battery is electrically charged to such a potential range that gives rise to the generation of oxygen gas from the positive electrode. Therefore, the proposed method significantly detracts from the remarkable advantage of a high capacity of a nickel/hydrate secondary battery.

Thus, the hydrogen storing alloy can become oxidized in an accelerated fashion to reduce the capacity of the battery after repeating the charge/discharge cycle or as a result of overcharging.

SUMMARY OF THE INVENTION

Therefore, it is a first object of the present invention to provide an alkaline secondary battery comprising a negative electrode made of a hydrogen storing alloy with its surface covered with a compound containing at least carbonic acid.

A second object of the present invention is to provide a method of manufacturing an alkaline secondary battery having a negative electrode made of a hydrogen storing alloy with its surface coated with a compound containing at least carbonic acid, a positive electrode, a separator and an electrolyte contained in a battery case, said method being characterized by a step of adding a carbonate compound to at least any of the negative electrode, the positive electrode, the separator and the electrolyte.

Another object of the present invention is to provide an alkaline secondary battery characterized by filling the battery case with a carbonate compound without adding it to any of the positive electrode, the negative electrode, the separator and the electrolyte.

According to the invention, there is provided an alkaline secondary battery that can effectively suppress the progress of the reaction of the hydrogen storing alloy and oxygen gas and remarkably withstand overcharging and an increased number of charge/discharge cycles by coating the surface of the hydrogen storing alloy by a compound containing at least a carbonate.

DESCRIPTION OF THE PREFERRED EMBODIMENTS

Figure 1:
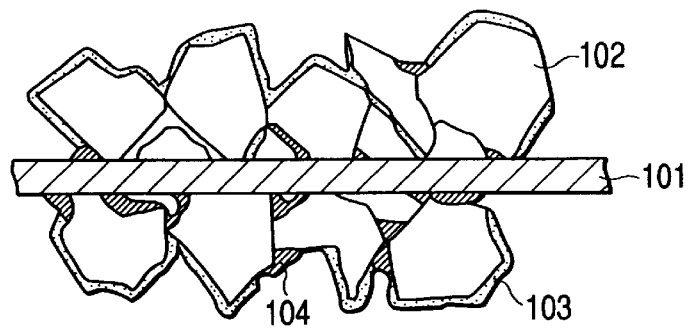
FIG. 1 is a schematic cross-sectional view of a negative electrode of an alkaline secondary battery according to the invention.

In view of the above-identified problems of known alkaline secondary batteries, the inventors of the present invention identified as a result of research efforts that the property of withstanding overcharging of an alkaline secondary battery is improved by adding a carbonate to the inside of the battery.

For the purpose of the invention, the surface of the hydrogen storing alloy operating as the negative electrode of an alkaline secondary battery is preferably coated with a carbonate-containing compound. This effect is particularly remarkable when a hydrogen storing alloy having a structure other than the $AB_5$ structure is used because, as pointed out above, the hydrogen storing alloy of a battery having the $AB_5$ structure can be made to withstand overcharging to a considerable extent by appropriately selecting its composition.

For the purpose of the invention, a hydrogen storing alloy having the $AB_2$ type crystal structure, the AB type crystal structure or the $A_2B$ type crystal structure is preferably used. Hydrogen storing alloys having the $AB_2$ type structure that can be used for the purpose of the invention include $ZrMn_2$ and $Zr_{0.3}Ti_{0.7}Mn_{0.5}Ni_{1.3}V_{0.2}$. Those having the AB structure include TiNi and $TiNi_{0.5}V_{0.2}Mn_{0.3}$, and those having the $A_2B$ structure include $Mg_2Ni$ and $Mg_{1.6}Al_{0.4}Ni_{0.8}Mn_{0.2}$.

For an alkaline secondary battery according to the invention, the surface of the hydrogen storing alloy does not have to be covered with a carbonate-containing compound in advance when preparing the hydrogen storing alloy but may be covered with a carbonate-containing compound after assembling the battery to bring forth its effect. Methods that can be used for covering the hydrogen storing alloy include adding carbonate of an alkali metal or an alkaline earth metal to the active material of the negative electrode when preparing the battery, adding such carbonate to the active material of the positive electrode, impregnating the separator with such carbonate and dissolving such carbonate in the electrolyte. Then, ions of the carbonate in the electrolyte react with the hydrogen storing alloy to form a layer of a carbonate-containing compound on the surface of the alloy.

Alkali metals and alkaline earth metals that can be used in the form of carbonate for the purpose of the invention include lithium, sodium, potassium, magnesium, calcium and barium. The particle size of the granular carbonate is preferably between 0.1 and 5 $\mu$m. The weight ratio of the carbonate relative to the hydrogen storing alloy is between 0.05 and 3 wt %, preferably between 0.2 and 1.5 wt %, in terms of carbonic acid in the carbonate. The effect of the additive will not be satisfactory if the ratio is lower than the above identified range. On the other hand carbonic acid ions in the electrolyte will adversely affect the diffusion of hydroxide ions to reduce the high discharging rate of the battery if the ratio is higher than the above range.

Preferably, the concentration of the electrolyte of an alkaline secondary battery according to the invention is higher than the ordinary level. The concentration of potassium hydroxide is preferably between 34 and 40 wt %. The use of lithium hydroxide or sodium hydroxide as additive will also be effective because such an additive can substantially compensate for the reduction in the hydroxy ion concentration of the electrolyte due to the addition of carbonate.

Not only nickel hydroxide but also manganese hydroxide may be used as the principal ingredient of the positive electrode of an alkaline secondary battery according to the invention.

The carbonic acid-containing compound on the surface of the hydrogen storing alloy specifically contains $CO_3$. More specifically, it can be expressed by formula $M^1(CO_3)_x \cdot M^2(OH)_y$ (where each of $M^1$ and $M^2$ represents one or more than one component elements of the hydrogen storing alloy, and x and y respectively represent numbers between 0.1 and 4). While it is not clear how the layer of such a compound gives rise to the above-identified effect, the effect is particularly remarkable when such a layer is formed on the surface of a hydrogen storing alloy containing any of the elements of Zr, Ti, Ni, Mn, V, Cr, Fe, Co and Al that show the $AB_2$ type crystal structure. The compound reacts with part or all of such elements contained in the alloy to produce carbonates of the elements that are not in a simple form, but rather in the form of basic carbonates containing not only carbonic acid ions but also water and potassium ions composing the electrolyte. Additionally, there are certain metals, each producing at least oxide or hydroxide.

Therefore, in an experiment, a sample of hydrogen storing alloy having the composition of $Zr_{0.3}Ti_{0.7}Mn_{0.5}Ni_{1.3}V_{0.2}$ to which an aqueous solution of potassium carbonate had been added and that of hydrogen storing alloy having the same composition to which the aqueous solution had not been added were stored in respective aqueous solutions of potassium hydroxide; subsequently, the samples of hydrogen storing alloy were washed with water and dried. Then, the surface of each of the samples of hydrogen storing alloy was observed by x-ray photoelectron spectroscopy. As for the sample to which potassium carbonate had been added, the chemical shift observed through the x-ray photoelectron spectroscope suggested the existence of carbonic acid in the sample. On the other hand, the sample to which potassium carbonate had not been added revealed no peaks. The existence of potassium, manganese and vanadium was confirmed regardless if an aqueous solution of potassium carbonate had been added or not. On the basis of peak shifts, the atoms of those elements presumably had been bound with hydroxyl groups and oxygen atoms when observed through the X-ray photoelectron spectroscope. Only small peaks were detected for zirconium, titanium and nickel respectively. In a gas chromatography analysis, specimens of the above two types of alloy were immersed in a 0.1N aqueous solution of sulfuric acid, and the generated gas was analyzed to detect a peak for carbon dioxide from the specimen of alloy to which potassium carbonate had been added.

It is inconceivable that the layer of the carbonic acid-containing compound formed on the surface directly reacts with the hydrogen storing alloy to produce metal carbonates, and presumably one or more than one metals that are apt to be dissolved into an alkaline aqueous solution or oxidized are eluted to produce basic carbonates of the metals. It is presumable that the basic carbonates of the metals are crystals with a relatively high density and permeability to hydrogen but not to oxygen.

Therefore, the rate of permeance of hydrogen gas and oxygen gas through the above hydrogen storing alloy was determined. A specimen of the hydrogen storing alloy having the above composition was immersed in a 30 wt % aqueous solution of potassium hydroxide and heated to dissolve the manganese and the vanadium therein it. Then, an aqueous solution of potassium carbonate was added to the above solution to produce basic carbonates of manganese and vanadium. The product was then formed into a 1 mm thick tablet and a 1:1 mixture of oxygen gas and hydrogen gas was made to flow there through from a side (inlet side). The composition of the gas coming out from the outlet was analyzed by gas chromatography to find that the hydrogen content was 99%.

Thus, the surface produces basic carbonates of the metals of the alloy that are apt to become hydroxides and/or oxides thereof, and the produced carbonates are barely soluble and dense and hence prevent the alloy from being oxidized further. On the other hand, the metals that are not apt to be oxidized are minimally affected by oxygen gas.

If no carbonates exist, the metals of the hydrogen storing alloy produce their hydroxides in the electrolyte that is an aqueous alkaline solution such as an aqueous solution of potassium hydroxide or sodium hydroxide. If the metals are oxidized to produce metal oxides, they presumably react with the electrolyte to produce metal hydroxides. Such hydroxides are mostly soluble in an aqueous alkaline solution, and hence the surface of the metals of the hydrogen storing alloy that can easily be eluted cannot be protected by such hydroxides for a long time. Of course, the metals of the hydrogen storing alloy that can barely be eluted or oxidized will practically not be affected.

Now, an embodiment of the invention will be described referring to FIG. 1.

FIG. 1 is a schematic cross-sectional view of one negative electrode of an alkaline secondary battery according to the invention. While collector 101 takes the form of a piece of punched metal in this embodiment, it may alternatively be a foamed metal, a felt-like metal, an expanded metal or a sheet metal. The collector 101 is typically made of nickel or nickel-plated iron, although other conductive metals that are alkali aqueous solution-resistant and electrochemically stable such as copper, stainless steel and titanium may also be used for the purpose of the invention. The surface of the hydrogen storing alloy 102 is coated with basic carbonates 103 of the metals that are contained in the hydrogen storing alloy and are apt to be eluted by an alkaline aqueous solution or oxidized. A polymeric binder agent 104 is used to bind the hydrogen storing alloy 102 itself and the hydrogen storing alloy 101 and the collector 102. The polymeric binder agent may be a cellulose type or may be made of polyvinyl alcohol, a modified compound of polyvinyl alcohol, vinyl acetate, polytetrafluoroethylene or some other similar substance. Additionally, carbon or nickel may be added to the negative electrode to improve the conductivity of the negative electrode.

Now, the method of preparing the negative electrode will be described.

For the negative electrode, the hydrogen storing alloy is crushed to particles of about 200 mesh or less, and the powdered hydrogen storing alloy and the polymeric binder solution are mixed and kneaded well into a paste or slurry. Then, the paste or slurry is applied to the punching metal by means of a doctor blade and dried. The drying temperature should be such that it does not give rise to decomposition of the binder and/or oxidation of the hydrogen storing alloy and will be about 200° C. or less. After the drying, work is pressed to produce a negative electrode in order to make the surface smooth and dense. The above process may be used when the collector is a foamed metal, a felt-like metal, an expanded metal or a sheet metal.

If the binder is made of polytetrafluoroethylene or the like that becomes fibrous thereby abruptly raising its viscosity, it is preferably applied by means of a roller.

While at least either carbonate of an alkali metal or that of an alkaline earth metal is added to the negative electrode of a secondary battery according to the invention, it may simply be added to the paste or slurry at the time of mixing and kneading so that the process is simple and easy. The particle size of the carbonate of the alkali metal or the alkaline earth metal is preferably between 0.1 and 5 μm so that particles of the carbonate may enter the inter-granular gaps of the hydrogen storing alloy and fill the gaps effectively without adversely affecting the operation of applying the paste or slurry to the collector.

The negative electrode may be prepared without using a binder agent. Then, a technique of making fine particles of the hydrogen storing alloy adhere to the collector under pressure and sintering them in a nitrogen or hydrogen atmosphere will be used. Again, this technique may be used when the collector is a foamed metal, a felt-like metal, an expanded metal or a sheet metal. If such is the case and the carbonate is added to the particles of the hydrogen storing alloy, however, the carbonate will be decomposed to produce carbon dioxide gas during the sintering process and become ineffective.

The positive electrode of a secondary battery according to the invention may be of the so-called sinter type or of the paste type. A sinter type positive electrode is prepared by mixing and kneading powdery carbonyl nickel and a cellulose type aqueous binder solution and applying the obtained mixture by means of a doctor blade to the collector, which may be in the form of a punched metal. Then, the applied mixture is dried to produce a porous nickel sinter, which is then immersed into an aqueous solution of nickel salt such as nickel nitrate or nickel sulfate to fill the pores of the sinter with the nickel salt. Subsequently, the nickel sinter is immersed into an alkaline aqueous solution such as potassium hydroxide or sodium hydroxide to turn the nickel salt in the pores into nickel hydroxide, which is rigidly held in the pores, before washing and drying the nickel sinter to produce a finished positive electrode.

On the other hand, a paste type positive electrode is prepared by using a collector in the form of a foamed metal or a felt-like metal and filling the pores of the collector with nickel hydroxide. For filling the pores with nickel hydroxide, the latter is mixed and kneaded with a binder agent into a paste or slurry, which is then applied to the collector by means of a doctor blade or a roller and dried. A cobalt compound or some other compound that can improve the performance of the battery may be added to the paste or slurry. The carbonate of an alkali metal or that of an alkaline earth metal may be added at this stage of operation to satisfactorily realize the intended effect. The particle size of the granular carbonate is preferably between 0.1 and 5 μm so that particles of the carbonate may fill the gaps effectively without adversely affecting the operation of applying the paste or slurry to the collector.

The separator of a secondary battery according to the invention plays the role of preventing short-circuiting of the positive and negative electrodes. It may also play the role of holding the electrolyte. The separator has to allow hydronium ions and hydroxy ions to move therein and must be insoluble to the electrolyte. Therefore, a sheet of unwoven fabric of yarned short fibers of nylon, polypropylene or polyethylene may suitably be used for the separator.

For the purpose of the invention, a carbonate compound may be added to the separator by impregnating the separator with an aqueous solution of the carbonate compound and then drying the solution, or it may be added to the short fibers that are being yearned before preparing the sheet of unwoven fabric.

The electrolyte of a secondary battery according to the invention contains an aqueous solution of potassium hydroxide as a principal ingredient, to which sodium or lithium is added to a small extent. The electrolyte is contained in the separator, the positive electrode and the negative electrode. Particularly, when the carbonate compound is added in a high concentration, the content of the aqueous solution of potassium hydroxide in the electrolyte will be raised.

The carbonate compound may be added to the electrolyte when dissolving potassium hydroxide into water for the purpose of the invention. Alternatively, an intended electrolyte may be obtained by causing the electrolyte to absorb carbon dioxide gas.

For the purpose of the invention, the carbonate may be produced by heating the paste type negative electrode in an electrochemical process, a chemical process or a combination of such processes.

For the purpose of the invention, the temperature to be used for causing the elements of the hydrogen storing alloy to react with carbonic ions of the added carbonate efficiently is preferably between 40 and 65° C. Then, the effect of the reaction will be remarkable particularly in a charged state.

Profile and Structure of the Battery

A secondary battery according to the invention may have a flat, cylindrical, box-like or sheet-like profile. The battery may be of the monolayer type, the multilayer type or the spiral type. A spiral type cylindrical battery can be prepared by winding the negative and positive electrodes into a roll with a separator sandwiched therebetween to produce a large surface area for each of the electrodes. A secondary battery having such electrodes can allow a large current to flow for charging and discharging. A box-like or sheet-like battery can, on the other hand, effectively utilize the internal space for containing the battery of the equipment to be driven by the battery.

Figure 2:
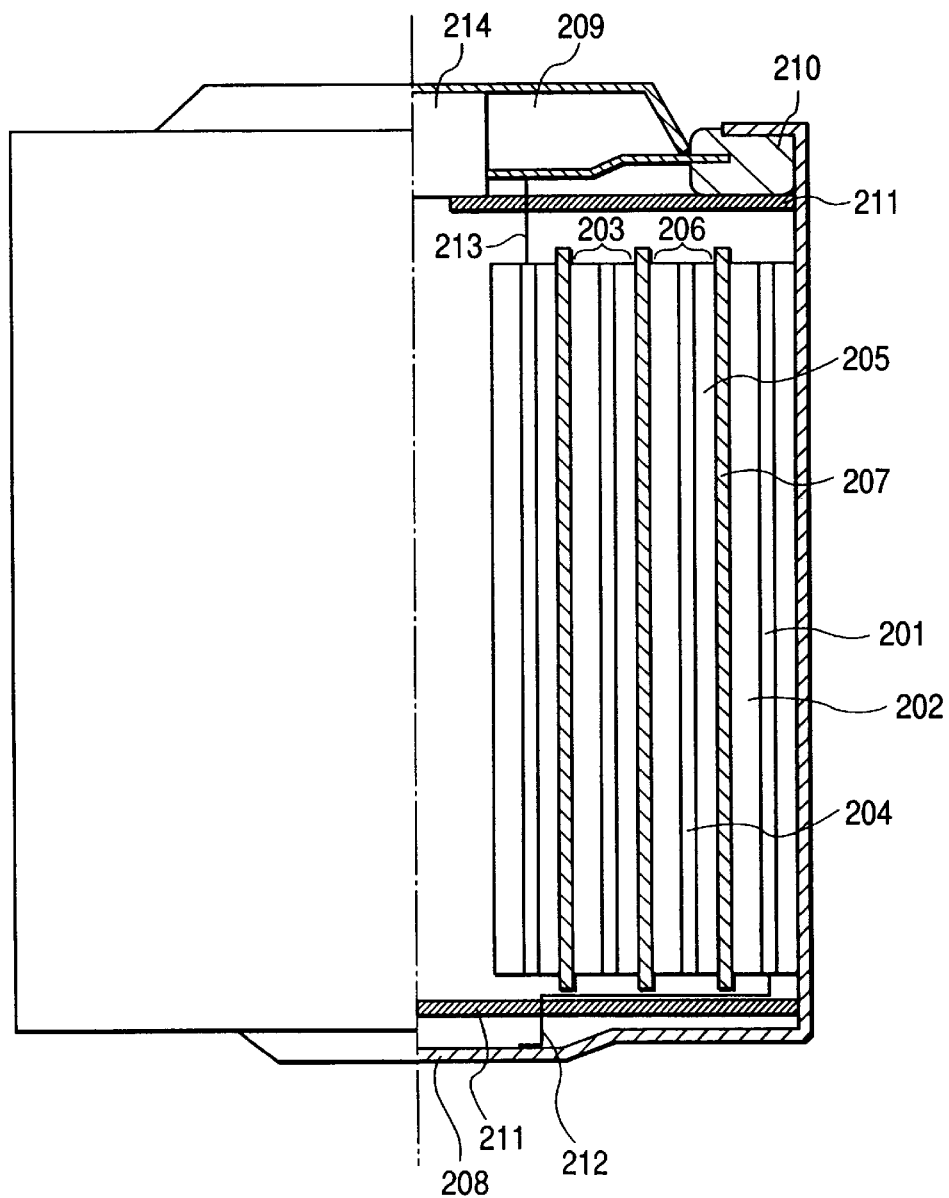
FIG. 2 is a schematic cross-sectional view of a nickel/hydrate secondary battery according to the invention.

Now, the profile and the structure of a secondary battery according to the invention will be discussed in greater detail by referring to FIG. 2. FIG. 2 is a schematic cross-sectional view of a spiral type cylindrical secondary battery according to the invention and comprising a negative electrode, a positive electrode, an electrolyte/separator, a battery housing and output terminals.

Referring to FIG. 2, there are shown a negative electrode 203, a positive electrode 206, a negative electrode terminal (negative electrode cap or negative electrode can) 208, a positive electrode terminal (positive electrode can or positive electrode cap) 209, an electrolyte/separator 207, a gasket 210, a negative electrode collector 201, a positive electrode collector 204, an insulator plate 211, a negative electrode lead 212, a positive electrode lead 213 and a safety valve 214.

More specifically, in a spiral type cylindrical secondary battery as shown in FIG. 2, a positive electrode 206 having a positive electrode active material layer 205 formed on a positive electrode collector 204 and the negative electrode 203 having a negative electrode active material layer 202 formed on a negative electrode collector 201 are oppositely arranged with a separator 207 impregnated at least with an electrolyte inserted therebetween and wound to show a cylindrical multilayer structure having a plurality of windings. Then, the cylindrical multilayer structure is contained in a negative electrode can 208 operating as a negative electrode terminal. A positive electrode cap 209 is provided at the open side of the negative electrode can 208 to operate as a positive electrode terminal, and a gasket 210 is arranged in another area in the negative electrode can. The cylindrical multilayer structure of the electrodes is separated from the positive electrode cap by means of an insulator plate 211. The positive electrode 206 is connected to the positive electrode cap 209 by way of a positive electrode lead 213. The negative electrode 203 is connected to the negative electrode can 208 by way of a negative electrode lead 212. A safety valve 214 is arranged at the side of the positive electrode cap to regulate the internal pressure of the battery.

Now, a method of assembling such a battery as shown in FIG. 2 will be described below. (1) The separator 207 is sandwiched between the negative electrode and the positive electrode 206, which are then wound and put into the negative electrode can 208. (2) After pouring the electrolyte, the positive electrode cap 209 and the gasket 210 are assembled. (3) The assembly of (2) is caulked to produce a complete battery.

For the purpose of the invention, the gasket 210 is made of a resin selected from fluorine resin, polyamide resin, polysulfone resin and polypropylene resin. The battery may be sealed by caulking the assembly as described above by referring to FIG. 2 or, alternatively, by using a sealed glass tube or an adhesive agent, by welding or by soldering.

The insulator plate 211 of FIG. 2 is typically made of an organic resin material or a ceramic material.

For the purpose of the invention, both the negative electrode can 208 and the positive electrode can 209 are preferably made of stainless steel. Particularly, the use of a titanium-clad stainless steel plate, a copper-clad stainless steel plate or a nickel-plated steel plate is preferable. If the negative electrode can 208 is not operating as a battery case, the latter may be made of a material selected from stainless steel, metals such as zinc, plastics such as polypropylene and composite materials such as metal and glass fiber or plastic.

A battery according to the invention is provided with a safety valve 214 as a safety measure that becomes effective when the internal pressure of the battery rises. The safety valve may be made of rubber, a spring, a metal ball or a burst foil.

Now, the present invention will be described further in greater detail by referring non-limitatively to examples.

EXAMPLE 1

An AA-size (14Φ×50) nickel/hydrate secondary battery having a cross-sectional view as shown in FIG. 2 was prepared. First, the negative electrode of the battery will be described.

A hydrogen storing alloy having a composition of $LaNi_5$ ($AB_5$ type) was prepared by means of an arc melting furnace. The prepared hydrogen storing alloy was crushed to particles of 400 to 200 mesh and used as active material.

Then, a 40 weight portion of a 2 wt % aqueous solution of methylcellulose and a 2 weight portion of potassium carbonate were added to a 100 weight portion of the powdery hydrogen storing alloy and the mixture was kneaded into a pasty state. The pasty mixture was then applied to a piece of punched metal obtained by plating a piece of iron with nickel by means of a doctor blade and subsequently dried at 150° C. Thereafter, the piece of punched metal was pressed in order to smooth the surface and compress the paste before it was cut to predetermined dimensions for the negative electrode.

Meanwhile, a 10 weight portion of cobalt oxide and a 40 weight portions of 2 wt % aqueous solution of a methylcellulose were added to a 100 weight portion of commercially available nickel hydroxide, and the mixture was kneaded into a pasty state. The pasty mixture was then applied to a piece of foamed nickel with a porosity of 94% to fill the pores and subsequently dried at 120° C. Thereafter, the piece of foamed nickel was pressed and cut to predetermined dimensions for the positive electrode. A terminal section was prepared on the positive electrode by pressing the piece of foamed nickel at an area thereof in advance so that the pressed area may not be filled with the slurry of nickel hydroxide and then bonding a nickel terminal to that area by means of resistance welding.

The hydroxide was prepared by adding lithium hydroxide (hydrate) by 1 wt % to a 30 wt % aqueous solution of potassium hydroxide.

The separator was made of a 0.15 mm thick piece of unwoven fabric of polypropylene.

The battery was assembled by winding the positive and negative electrodes with the separator sandwiched therebetween. The battery case was made of nickel-plated iron. The closure was also made of nickel-plated iron and provided with a safety valve. Fluorine resin was used for packing the case.

The nickel/hydrate secondary battery was activated by repeating twice a cycle of charging it at 0.1 CmA for 15 hours and discharging it at 0.2 CmA until a final voltage of 1.0V was reached.

The battery (after the charge/discharge cycles) was disassembled, and the negative electrode was washed with water and dried in vacuum before analyzing the surface of the particles of the negative electrode. They were subjected to x-ray photoelectron spectroscopy from the viewpoint of carbon (C1s), oxygen (O1s), and metal elements (Ni2p2/3, Lad5/2). Peaks attributable to carbon were found at 286 eV and 289 eV, of which the peak at 286 eV should be that of methylcellulose and the peak at 289 eV should be that of a metal carbonate. A broad peak attributable to oxygen was found at or near 531 eV, which was believed to be attributable to carbonic acid as well as to oxides and hydroxides. A peak that seemed to be attributable to a metal was found at 835 eV, and it was confirmed that the metal was La. As viewed in combination with the effect of carbon, it was believed that there was at least a substance produced as La was chemically bound with carbon. No peak attributable to Ni was found.

The surface of the particles was observed as they were subjected to Ar etching to find that the peak attributable to carbon was no longer detectable when the etching got to a depth of about 0.15 μm. On the basis of this fact, it may be safe to presume that there was an about 0.15 μm thick layer where carbonate and cellulose coexisted.

Then, the hydroxylic group on the surface of the particles was analyzed by means of FT-IR, using a KBr technique. As a result, a peak which was not that of methylcellulose was detected, and it was found that a stretching vibration of OH was responsible for it.

In order to quantify carbonic acid and OH, the specimen was subjected to a temperature-raising thermal analysis, where the temperature was raised at a rate of 5° C./min in a nitrogen atmosphere. As a result, a weight loss due to decomposition was observed from about 100° C. to about 400° C. Independently, methylcellulose was subjected to a thermal analysis, and the weight loss of the sample was corrected using the result of the thermal analysis of methylcellulose to quantify $CO_3$ and OH. As a result, $CO_3$ and OH were found to be equal to 1.2 and 1.5, respectively.

EXAMPLE 2

A hydrogen storing alloy having a composition of $MmNi_{3.5}CO_{0.5}Mn_{0.4}Al_{0.3}$ ($AB_5$ type) was prepared in an arc melting furnace. A nickel/hydrate secondary battery was prepared as in Example 1 using the hydrogen storing alloy and activated.

The surface of the particles of the negative electrode was analyzed as in Example 1. The particles were subjected to x-ray photoelectron spectroscopy from the viewpoint of metal elements including Ni, La, Co, Mn and Al. Peaks attributable to carbon and oxygen were substantially the same as those of Example 1, although they showed a slight shift. Of the peaks attributable to metals, Mn was the largest, followed by Al and La. As viewed in combination with the effect of carbon, it was believed that there was at least a substance produced as Mn was chemically bound with carbon. No peak attributable to Ni or Co was found.

The surface of the particles was observed as they were subjected to Ar etching to find that the peak attributable to carbon was no longer detectable when the etching got to a depth of about 0.1 $\mu$m. On the basis of this fact, it may be safe to presume that there was an about 0.1 $\mu$m thick layer where carbonate and cellulose coexisted.

Then, the hydroxylic group on the surface of the particles was analyzed by means of FT-IR, using a KBr technique. As a result, a peak which was not that of methylcellulose was detected, and it was found that a stretching vibration of OH was responsible for it.

In order to quantify carbonic acid and OH, the specimen was subjected to a temperature-raising thermal analysis, where the temperature was raised at a rate of 5° C./min in a nitrogen atmosphere. As a result, a weight loss due to decomposition was observed from about 100° C. to about 400° C. Independently, methylcellulose was subjected to a thermal analysis and the weight loss of the sample was corrected by using the result of the thermal analysis of methylcellulose to quantify $CO_{0.3}$ and OH. As a result, $CO_3$ and OH were found to be equal to 0.9 and 1.8, respectively.

EXAMPLE 3

A hydrogen storing alloy having a composition of $ZrMn_2$ ($AB_2$ type) was prepared in an arc melting furnace. A nickel/hydrate secondary battery was prepared as in Example 1 using the hydrogen storing alloy and activated.

EXAMPLE 4

A hydrogen storing alloy having a composition of $Zr_{0.3}Ti_{0.7}Mn_{0.5}Ni_{1.3}V_{0.2}$ ($AB_2$ type) was prepared in an arc melting furnace. A nickel/hydrate secondary battery was prepared as in Example 1 using the hydrogen storing alloy and activated.

The surface of the particles of the negative electrode was analyzed as in Example 1. The particles were subjected to x-ray photoelectron spectroscopy from the viewpoint of metal elements including Zr, Ti, Ni, Mn and V. Peaks attributable to carbon and oxygen were substantially the same as those of Example 1, although they showed a slight shift. Of the peaks attributable to metals, V was the largest, followed by Mn and Ti. As viewed in combination with the effect of carbon, it was believed that there was at least a substance produced as V was chemically bound with carbon. No peak attributable to Zr or Ni was found.

The surface of the particles was observed as they were subjected to Ar etching to find that the peak attributable to carbon was no longer detectable when the etching got to a depth of about 0.19 $\mu$m. On the basis of this fact, it may be safe to presume that there was an about 0.19 $\mu$m thick layer where carbonate and cellulose coexisted.

Then, the hydroxylic group on the surface of the particles was analyzed by means of FT-IR, using a KBr technique. As a result, a peak which was not that of methylcellulose was detected, and it was found that a stretching vibration of OH was responsible for it.

In order to quantify carbonic acid and OH, the specimen was subjected to a temperature-raising thermal analysis, where the temperature was raised at a rate of 5° C./min in a nitrogen atmosphere. As a result, a weight loss due to decomposition was observed from about 100° C. to about 400° C. Independently, methylcellulose was subjected to a thermal analysis, and the weight loss of the sample was corrected using the result of the thermal analysis of methylcellulose to quantify $CO_3$ and OH. As a result, $CO_3$ and OH were found to be equal to 1.9 and 0.7, respectively.

EXAMPLE 5

A hydrogen storing alloy having a composition of TiNi (AB type) was prepared in an arc melting furnace. A nickel/hydrate secondary battery was prepared as in Example 1 using the hydrogen storing alloy and activated.

EXAMPLE 6

A hydrogen storing alloy having a composition of $TiNi_{0.5}V_{0.2}Mn_{0.3}$ (AB type) was prepared in an arc melting furnace. A nickel/hydrate secondary battery was prepared as in Example 1 using the hydrogen storing alloy and activated.

EXAMPLE 7

A hydrogen storing alloy having a composition of $Mg_2Ni$ ($A_2B$ type) was prepared in an arc melting furnace. A nickel/hydrate secondary battery was prepared as in Example 1 using the hydrogen storing alloy and activated.

EXAMPLE 8

Potassium carbonate of Example 1 was replaced by lithium carbonate in order to examine the dependency on the type of carbonate. A hydrogen storing alloy having a composition of $Zr_{0.3}Ti_{0.7}Mn_{0.5}Ni_{1.3}V_{0.2}$ was prepared in an arc melting furnace. Otherwise, the process of Example 1 was followed.

EXAMPLE 9

Potassium carbonate of Example 1 was replaced by sodium carbonate in order to examine the dependency on the type of carbonate. A hydrogen storing alloy having a composition of $Zr_{0.3}Ti_{0.7}Mn_{0.5}Ni_{1.3}V_{0.2}$ was prepared in an arc melting furnace. Otherwise, the process of Example 1 was followed.

EXAMPLE 10

Potassium carbonate of Example 1 was replaced by magnesium carbonate in order to examine the dependency on the type of carbonate. A hydrogen storing alloy having a composition of $Zr_{0.3}Ti_{0.7}Mn_{0.5}Ni_{1.3}V_{0.2}$ was prepared in an arc melting furnace. Otherwise, the process of Example 1 was followed.

EXAMPLE 11

Potassium carbonate of Example 1 was replaced by calcium carbonate in order to examine the dependency on the type of carbonate. A hydrogen storing alloy having a composition of $Zr_{0.3}Ti_{0.7}Mn_{0.5}Ni_{1.3}V_{0.2}$ was prepared in an arc melting furnace. Otherwise, the process of Example 1 was followed.

EXAMPLE 12

To add potassium carbonate to the positive electrode, nickel hydroxide and cobalt oxide were added simultaneously with it and kneaded in an aqueous solution of methylcellulose. The quantity of the additive was so selected that the performance of the battery was the same as it was added to the negative electrode. A hydrogen storing alloy having a composition of $Zr_{0.3}Ti_{0.7}Mn_{0.5}Ni_{1.3}V_{0.2}$ was prepared in an arc melting furnace. A battery was prepared as in Example 1 except that no potassium carbonate was added to the negative electrode. Otherwise, the process of Example 1 was followed in terms of the conditions of preparing and activating the battery.

EXAMPLE 13

A nylon separator was dipped into a 5 wt % aqueous solution of potassium carbonate and dried at 60° C. before it was placed in position. A hydrogen storing alloy having a composition of $Zr_{0.3}Ti_{0.7}Mn_{0.5}Ni_{1.3}V_{0.2}$ was prepared in an arc melting furnace. A battery was prepared as in Example 1 except that no potassium carbonate was added to the negative electrode. Otherwise, the process of Example 1 was followed in terms of the conditions of preparing and activating the battery.

EXAMPLE 14

Potassium carbonate was dissolved into the electrolyte, which was an aqueous solution containing potassium hydroxide by 30 wt % and lithium hydroxide by 1.0 wt %, by an amount corresponding to the amount added to the negative electrode. A hydrogen storing alloy having a composition of $Zr_{0.3}Ti_{0.7}Mn_{0.5}Ni_{1.3}V_{0.2}$ was prepared in an arc melting furnace. A battery was prepared as in Example 1 except that no potassium carbonate was added to the negative electrode. Otherwise, the process of Example 1 was followed in terms of the conditions of preparing and activating the battery.

EXAMPLE 15

Sample batteries were prepared, using different potassium hydroxide concentrations of 34 wt % (battery A), 37 wt % (battery B), 40 wt % (battery C) and 43 wt % (battery D) for the respective electrolytes, to each of which lithium hydroxide was added by 1 wt %. A hydrogen storing alloy having a composition of $Zr_{0.3}Ti_{0.7}Mn_{0.5}Ni_{1.3}V_{0.2}$ was prepared in an arc melting furnace. Otherwise, the process of Example 1 was followed in terms of the conditions of preparing and activating the battery.

COMPARATIVE EXAMPLE 1

A hydrogen storing alloy having a composition of $LaNi_5$ ($AB_5$ type) was prepared in an arc melting furnace. A nickel/hydrate secondary battery was prepared as in Example 1 using the hydrogen storing alloy, to which, however no potassium carbonate was added, and activated.

COMPARATIVE EXAMPLE 2

A hydrogen storing alloy having a composition of $MmNi_{3.5}Co_{0.8}Mn_{0.4}Al_{0.3}$ ($AB_5$ type) was prepared in an arc melting furnace. A nickel/hydrate secondary battery was prepared as in Example 1 using the hydrogen storing alloy, to which, however no potassium carbonate was added, and activated.

COMPARATIVE EXAMPLE 3

A hydrogen storing alloy having a composition of $ZrMn_2$ ($AB_2$ type) was prepared in an arc melting furnace. A nickel/hydrate secondary battery was prepared as in Example 1 using the hydrogen storing alloy, to which, however no potassium carbonate was added, and activated.

COMPARATIVE EXAMPLE 4

A hydrogen storing alloy having a composition of $Zr_{0.3}Ti_{0.7}Mn_{0.5}Ni_{1.3}V_{0.2}$ ($AB_2$ type) was prepared in an arc melting furnace. A nickel/hydrate secondary battery was prepared as in Example 1 using the hydrogen storing alloy, to which, however no potassium carbonate was added, and activated.

COMPARATIVE EXAMPLE 5

A hydrogen storing alloy having a composition of TiNi (AB type) was prepared in an arc melting furnace. A nickel/hydrate secondary battery was prepared as in Example 1 using the hydrogen storing alloy, to which, however no potassium carbonate was added, and activated.

COMPARATIVE EXAMPLE 6

A hydrogen storing alloy having a composition of $TiNi_{0.5}V_{0.2}Mn_{0.3}$ (AB type) was prepared in an arc melting furnace. A nickel/hydrate secondary battery was prepared as in Example 1 using the hydrogen storing alloy, to which, however no potassium carbonate was added, and activated.

COMPARATIVE EXAMPLE 7

A hydrogen storing alloy having a composition of $Mg_2Ni$ ($A_2B$ type) was prepared in an arc melting furnace. A nickel/hydrate secondary battery was prepared as in Example 1 using the hydrogen storing alloy, to which, however, no potassium carbonate was added, and activated.

Then, each of the above batteries was subjected to an overcharging and charge/discharge cycles under the following conditions to evaluate performance. Particularly, the batteries of the examples and those of the comparative examples were compared for performance.

For overcharging, each of the charged batteries was charged at 0.1 CmA continuously for 30 days and discharged at 0.2 mA until the final voltage of 1.0V. Thereafter, it was charged at 0.1 CmA and discharged at 0.2 CmA to see the battery capacity. The discharge capacity was compared with the battery capacity at the second cycle of charge/discharge after activation.

As for the charge/discharge cycle life, $-\Delta V=5$ mV was selected for charging at 1 CmA in the $-\Delta V$ charging mode, whereas a final voltage of 1V was selected for discharging at 1 CmA.

Table 1 below lists the battery capacity (ratio to the activation capacity) after overcharging and the number of cycles before the fall to 60% of the initial capacity for each of the different hydrogen storing alloys used in the above examples and comparative examples.

TABLE 1

| Battery No. | Alloy Composition (Type) | $K_2CO_3$ Added | Capacity After Over-charging (%) | Number of Cycles in Service Life |
|---|---|---|---|---|
| Example 1 | $LaNi_5$ ($AB_5$) | Yes | 75 | 200 |
| Example 2 | $MmNi_{3.5}Co_{0.8}Mn_{0.4}Al_{0.3}$ ($AB_5$) | Yes | 93 | 1120 |
| Example 3 | $ZeMn_2$ ($AB_2$) | Yes | 88 | 410 |
| Example 4 | $Zr_{0.3}Ti_{0.7}Mn_{0.5}Ni_{1.3}V_{0.2}$ ($AB_2$) | Yes | 97 | 1250 |
| Example 5 | TiNi (AB) | Yes | 83 | 320 |
| Example 6 | $TiNi_{0.5}V_{0.2}Mn_{0.3}$ (AB) | Yes | 94 | 900 |
| Example 7 | $Mg_2Ni$ ($A_2B$) | Yes | 86 | 230 |
| Comparative Example 1 | $LaNi_5$ ($AB_5$) | No | 70 | 110 |
| Comparative Example 2 | $MmNi_{3.5}Co_{0.8}Mn_{0.4}Al_{0.3}$ ($AB_5$) | No | 88 | 850 |
| Comparative Example 3 | $ZrMn_2$ ($AB_2$) | No | 80 | 250 |
| Comparative Example 4 | $Zr_{0.3}Ti_{0.7}Mn_{0.5}Ni_{1.3}V_{0.2}$ ($AB_2$) | No | 85 | 500 |
| Comparative Example 5 | TiNi (AB) | No | 75 | 150 |
| Comparative Example 6 | $TiNi_{0.5}V_{0.2}Mn_{0.3}$ (AB) | No | 85 | 450 |
| Comparative Example 7 | $Mg_2Ni$ ($A_2B$) | No | 73 | 70 |

From Table 1 above, it will be seen that the capacity drop of a battery containing the additive of potassium carbonate is relatively small after overcharging for 30 days at 0.1 CmA. Particularly, a battery using a hydrogen storing alloy of the $AB_2$, AB or $A_2B$ type shows a capacity drop smaller than that of a hydrogen storing alloy of the $AB_5$ type. Additionally, the number of charge/discharge cycles before the end of the service life is longer for a battery containing the additive of potassium carbonate than for a battery without potassium carbonate. While the battery of the $AB_5$ type of Comparative Example 2 showed a long service life, although it does not contain the additive of potassium carbonate, it was obtained by regulating the composition of the alloy. The composition nevertheless proved the effect of adding potassium carbonate.

The nickel/hydrate secondary batteries of the above examples that contained the additive of potassium carbonate showed a reduced capacity drop after overcharging and a prolonged cycle life as compared with their counterparts of the comparative examples that did not contain any additive of potassium carbonate.

Table 2 below shows the nickel/hydrate secondary batteries of the examples to which lithium carbonate, sodium carbonate, magnesium carbonate and calcium carbonate were added respectively.

TABLE 2

| Battery No. | Carbonate | Capacity After Over-charging (%) | Number of Cycles in Service Life |
|---|---|---|---|
| Example 8 | Lithium Carbonate | 94 | 1050 |
| Example 9 | Sodium Carbonate | 97 | 1200 |
| Example 10 | Potassium Carbonate | 97 | 1250 |
| Example 11 | Calcium Carbonate | 97 | 1320 |

From Table 2 above, it will be seen that all the added carbonates clearly provided a positive effect on overcharging and the cycle life with slight differences in the level of effect.

Table 3 below shows the effect of different ways of adding a carbonate. It will be seen that the additive of a carbonate was positively effective for overcharging and the cycle life with slight differences in the level of effect depending on the way in which it was added.

TABLE 3

| Battery No. | Spot of Adding Carbonate | Capacity After Over-charging (%) | Number of Cycles in Service Life |
|---|---|---|---|
| Example 12 | Positive Electrode | 96 | 1200 |
| Example 13 | Separator | 97 | 1300 |
| Example 14 | Electrolyte | 97 | 1220 |

Table 4 below shows the effect of the concentration of the electrolyte. The battery capacity was increased as the concentration of the electrolyte rose. While the concentration had practically no effect on overcharging, it had a significant effect on the cycle life. The cycle life of the battery was adversely affected as the concentration exceeded the normal 30 wt %. This negative effect was particularly remarkable when the concentration was 43 wt %.

TABLE 4

| Battery No. | Potassium Hydroxide Concentration (%) | Battery Capacity (%) | Capacity After Over-charging (%) | Number of Cycles in Service Life |
|---|---|---|---|---|
| Example 4 | 30 | 100 | 97 | 1250 |
| Example 15A | 34 | 105 | 96 | 1250 |
| Example 15B | 37 | 108 | 97 | 1200 |
| Example 15C | 40 | 108 | 97 | 1180 |
| Example 15D | 43 | 110 | 96 | 980 |

What is claimed is:
1. An alkaline secondary battery comprising a negative electrode made of a hydrogen storing alloy with its surface covered with a layer comprising a carbonic acid-containing compound represented by $M^1(CO_3)_x \cdot M^2(OH)_y$, wherein each of $M^1$ and $M^2$ represents one or more than one component elements of the hydrogen storing alloy and x and y respectively represent numbers between 0.1 and 4.

2. The alkaline secondary battery according to claim 1, wherein a crystal structure of the hydrogen storing alloy is of the $AB_2$ type, the AB type or the $A_2B$ type.

3. The alkaline secondary battery according to claim 1, wherein a particle size of the hydrogen storing alloy is 200 mesh or less.

4. The alkaline secondary battery according to claim 1, wherein the hydrogen storing alloy contains any of Mn, V, Cr, Al, Co, Ti, Zr, Ni or Fe.

5. The alkaline secondary battery according to claim 1, wherein the surface layer further comprises at least one of an oxide and a hydroxide of the component elements of the hydrogen storing alloy.

6. The alkaline secondary battery according to claim 5, wherein the surface layer has a thickness between 0.05 and 2 μm.

7. The alkaline secondary battery according to claim 5, wherein the surface layer further comprises a water soluble binder agent.

8. The alkaline secondary battery according to claim 5, wherein the surface layer further comprises a water-repellant binder agent.

9. An alkaline secondary battery according to claim 7 or 8, wherein the carbonic acid-containing compound is formed by thermally, electrochemically or chemically decomposing part of the binder agent.

10. The alkaline secondary battery according to claim 1, wherein the negative electrode made of the hydrogen storing alloy is prepared by sintering.

11. The alkaline secondary battery according to claim 1, wherein the positive electrode is made of nickel hydroxide or manganese hydroxide.

* * * * *

UNITED STATES PATENT AND TRADEMARK OFFICE
CERTIFICATE OF CORRECTION

PATENT NO. : 6,171,727 B1
DATED : January 9, 2001
INVENTOR(S) : Takao Ogura et al.

It is certified that error appears in the above-identified patent and that said Letters Patent is hereby corrected as shown below:

Column 1,
Line 27, "the" should be deleted; and
Line 31, "and" should be -- and a --; and
Line 49, "not" should be deleted.

Column 2,
Line 21, "an" should be deleted; and
Line 49, "gas , and" should read -- gas, and --.

Column 3,
Line 4, "hydroxide that" should read -- hydroxide; --.

Column 4,
Line 54, "hand" should read -- hand, --.

Column 5,
Line 52, "than one" should read -- than one of the --; and
Line 64, "therein it." should read -- therein. --.

Column 6,
Line 25, "one" should read -- a --;
Line 40, "101 and the collector 102." should read
-- 102 and the collector 101. --; and
Line 57, "the drying, work" should read -- drying, the work --.

Column 7,
Line 22, "of" (both occurrences) should be deleted; and
Line 38, "by" should be deleted.

UNITED STATES PATENT AND TRADEMARK OFFICE
CERTIFICATE OF CORRECTION

PATENT NO. : 6,171,727 B1
DATED : January 9, 2001
INVENTOR(S) : Takao Ogura et al.

It is certified that error appears in the above-identified patent and that said Letters Patent is hereby corrected as shown below:

Column 9,
Line 64, "portions of" should read -- portion of a --.

Column 11,
Line 34, "$CO_{0.3}$" should read -- $CO_3$ --.

Column 17,
Line 4, "elements" should read -- element --.

Column 18,
Line 5, "water-repellant" should read -- water-repellent --.

Signed and Sealed this

Eighteenth Day of December, 2001

Attest:

Attesting Officer

JAMES E. ROGAN
Director of the United States Patent and Trademark Office